April 4, 1944.   C. W. CHILLSON   2,346,007
PROPELLER REVERSING PITCH CONTROL
Filed April 9, 1941   4 Sheets-Sheet 1

INVENTOR
CHARLES W. CHILLSON
BY
ATTORNEY

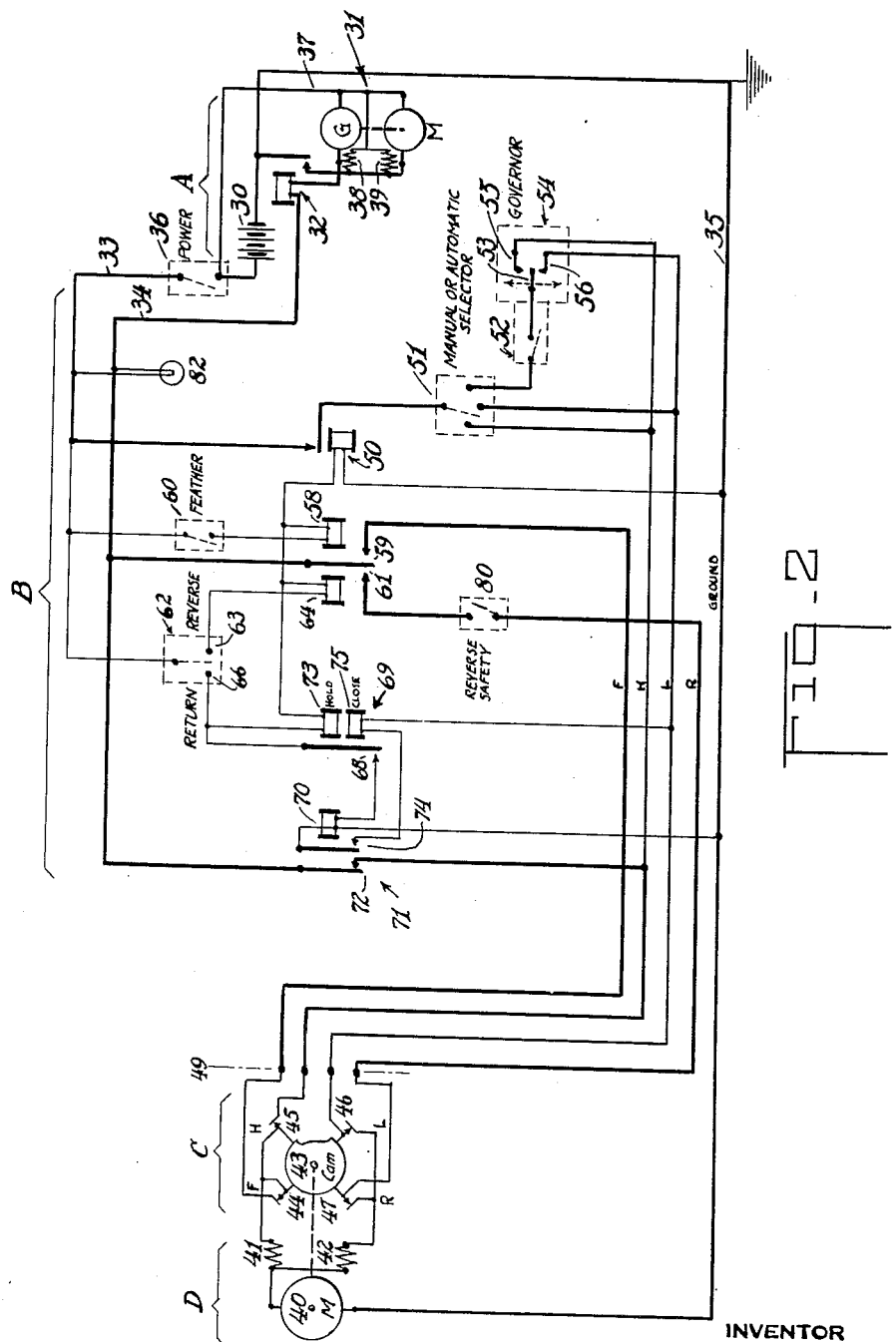

April 4, 1944.   C. W. CHILLSON   2,346,007
PROPELLER REVERSING PITCH CONTROL
Filed April 9, 1941   4 Sheets-Sheet 3
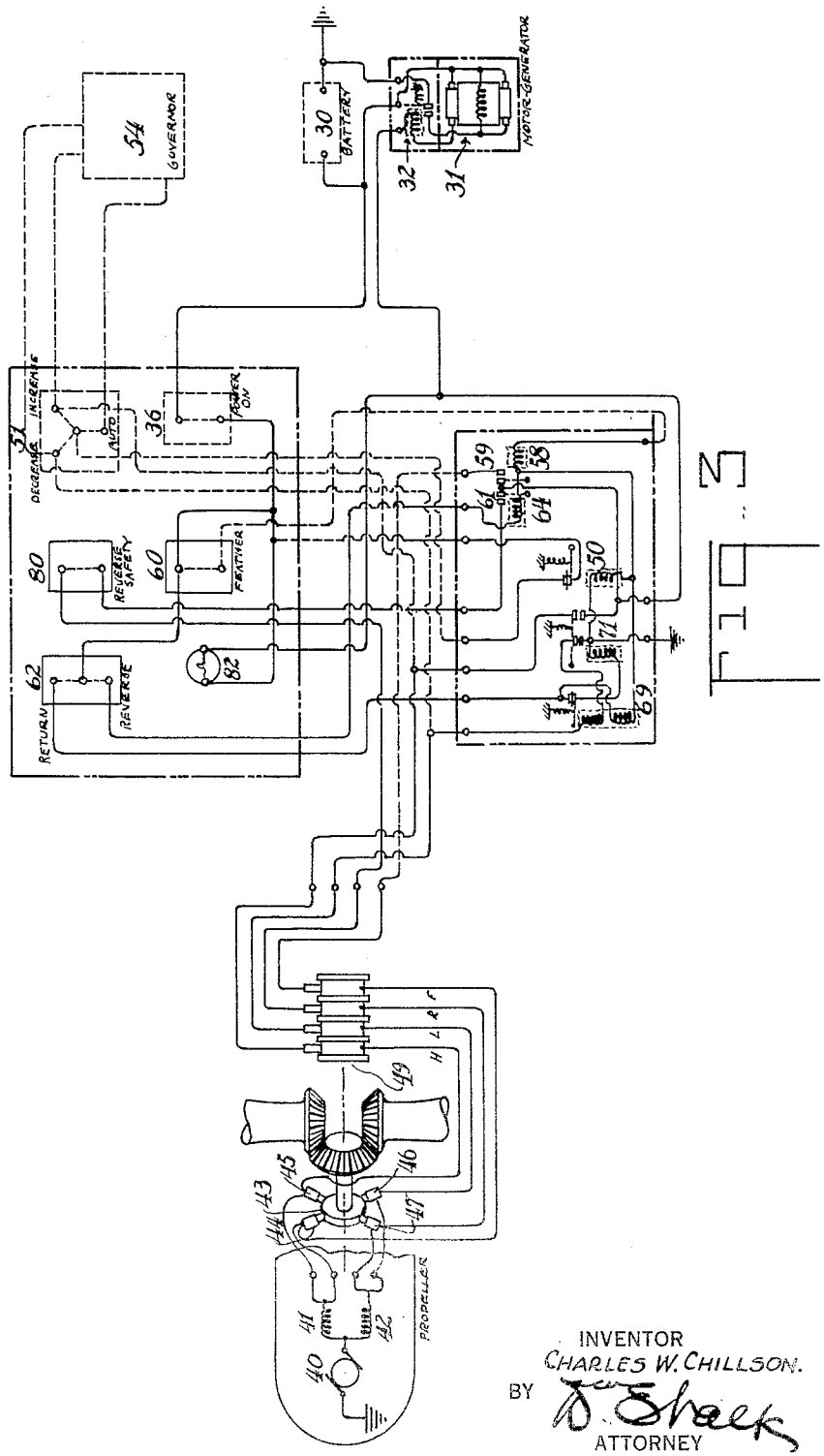
INVENTOR
CHARLES W. CHILLSON.
BY
ATTORNEY

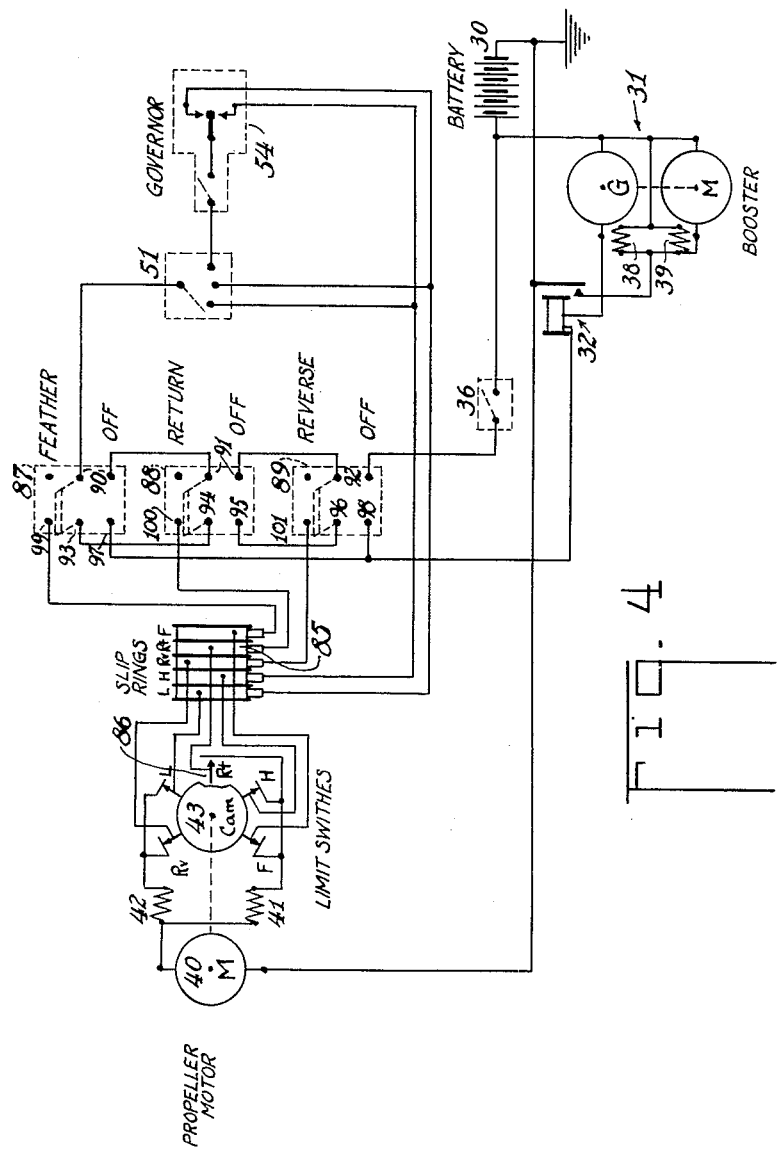

Patented Apr. 4, 1944

2,346,007

UNITED STATES PATENT OFFICE 2,346,007

PROPELLER REVERSING PITCH CONTROL

Charles W. Chillson, Packanack Lake, N. J., assignor to Curtiss-Wright Corporation, a corporation of Delaware Application April 9, 1941, Serial No. 387,624

12 Claims. (Cl. 170—163)

This invention relates to aircraft and to controllable pitch propellers therefor, and is concerned particularly with improvements in the method of and means for maneuvering multi-engine seaplanes on the water by the use of propellers whose pitch may be reversed to attain rearward thrust.

An object of the invention is to teach a method of maneuvering of flying boats and the like on the water. A further object is to provide means to control the pitch of controllable aircraft propellers so that reverse thrust may at times be secured. A further object is to provide a propeller pitch control system having pitch adjusting provisions for normal flight pitch change, and in addition, having control devices by which feathering and pitch reversal of the propeller blades may be attained. A further object is to provide a control system for electrically operated propellers wherein high voltage power may be utilized for quickly adjusting the propeller to feathering or reverse pitch positions, while low voltage power is utilized for the normal pitch change during flight. In this connection, the normal range of pitch change for flight conditions may be between about 15° and 60° from the plane of rotation. Feathering involves changing the pitch angle of the blades to substantially 90° to the plane of rotation whereas pitch reversing involves a decrease of pitch from the normal operating range to about —20°. Thus, it will be seen that the angular change of the blades from normal when they are adjusted either to feathering or reverse pitch is considerable and in order to expedite the movement of the blades to these positions, fast action may be secured through the use of high voltage power rather than the usual low voltage power. A further object of the invention comprises the provision of means to convert low voltage power to high voltage power and to provide automatic control switching by which the suitable power source is selected according to the function desired.

The several provisions of the invention may be better understood by referring to the drawings, in which:

Fig. 2 is a wiring diagram of the power, control, and operating circuits for one of the controllable pitch propellers as used in the aircraft of Fig. 1;

Fig. 3 is a schematic wiring layout; and

Fig. 4 is a wiring diagram of an alternative embodiment.

Figure 1:
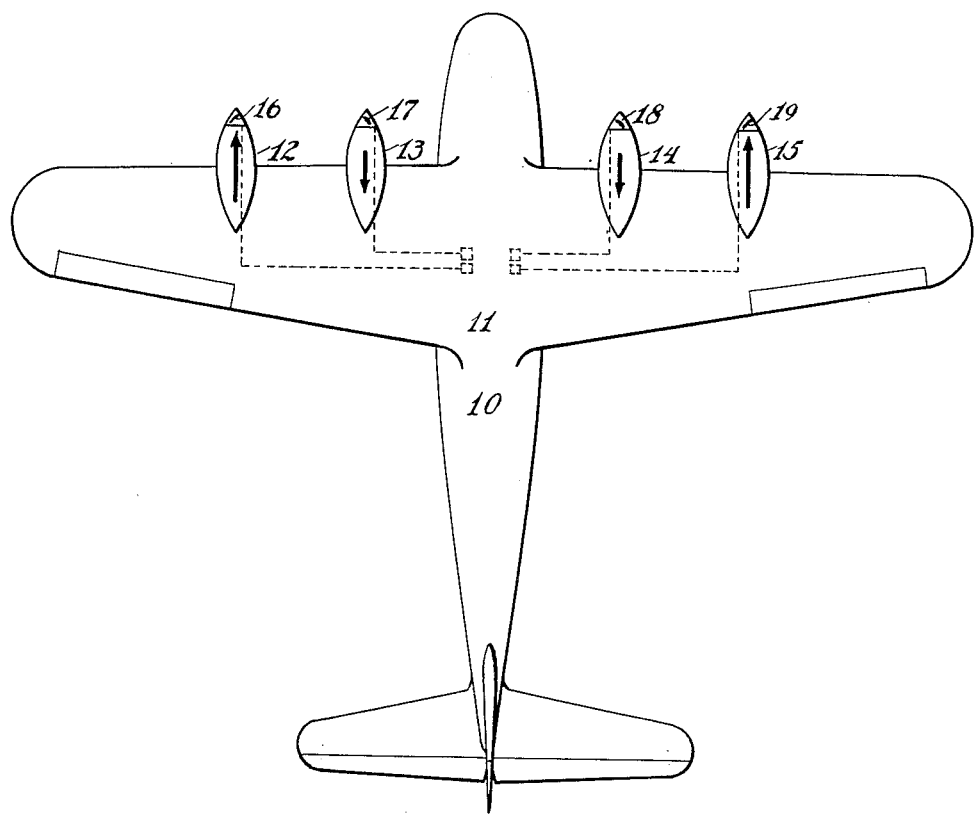
Fig. 1 is a plan of a four-engine seaplane.

First referring to Fig. 1, the flying boat comprises the usual hull 10 having a main lifting surface 11 along the leading edge of which are spaced four power plant nacelles 12, 13, 14, and 15. Each of these nacelles houses an engine and each engine is equipped with a controllable pitch propeller, the propellers respectively being designated 16, 17, 18, and 19. The several engines are provided, as usual, with independent control equipment and the several propellers 16 to 19 are controllable in pitch by electrical means after the manner of that shown in Patent No. 1,950,320 issued in the name of W. J. Blanchard on March 13, 1934. Propellers of the Blanchard type include an electric motor mounted in the hub which is reduction geared to the propeller blades. The electric motor includes one field winding for pitch increase and another field winding for pitch decrease. Further developments in the Blanchard type of propeller include controls by which propeller pitch is adjusted to maintain constant engine speed and additionally, limit switches have been incorporated in the electrical system by which the propeller pitch change may not pass certain high and low limits. In ordinary flight, each of the four propellers 16 to 19 would be controlled either by the governor for the respective propellers or by manual selection for pitch increase and decrease. For flight purposes, the speeds of the several engines may be controlled through the governor devices on the propellers by means which do not form a part of this invention. It is feasible, in electric type propellers, to cause the blades to move to negative pitch position and, since the engines all rotate in the same direction, pitch reversal will afford negative thrust.

Negative thrust from an aircraft propeller may be used (1) to reduce airplane landing speeds and runs, (2) to aid in maneuvering lighter-than-air craft near the ground, (3) to limit terminal velocity of diving aircraft, (4) to gain added control in other flight maneuvers, and (5) to gain control not otherwise possible in maneuvering flying boats on the water. Negative thrust from the propellers can have a great deal of utility in the operation of multi-engined flying boats on the water. For instance, in the four-engined boat shown, the two inboard engines 13 and 14 may be set for reverse pitch while the two outboard engines 12 and 15 may be set for normal pitch or vice versa. Then, by manipulating the speeds of the engines in different combinations, forward and reverse thrust and turning moments in either direction may be obtained. For instance, if the inboard engines 13 and 14 be throttled down and the outboard engines 12 and 15 be accelerated, forward thrust for taxiing the aircraft along the water in a straight line is secured. If the engines 12 and 15 be throttled down and the engines 13 and 14 be accelerated, rearward thrust for backing up is secured. If the engines 12 and 14 be throttled down and the engines 13 and 15 accelerated, a turning couple to the left is secured, while if the engines 12 and 14 are accelerated with the others idle, a turning couple to the right is secured. Various other combinations will be apparent to those skilled in the art to afford great maneuverability under adverse tide and wind conditions. Reference may be made to an article by the inventor in the "Journal of the Aeronautical Sciences" for May, 1940, in which the technique of maneuvering large flying boats is treated in greater detail.

In using propeller pitch reversal as a means for gaining water maneuverability, it is preferable to set the desired propeller in reverse pitch and then to use the engine throttle as a means of increasing or diminishing the negative thrust available from the propeller. This mode of operation permits the pilot to use the engine controls to which he is fully accustomed without manipulating, during maneuvering processes, various special controls. The special controls for reverse pitch comprise actually, a means for preselecting reverse pitch which may be negatived after the maneuvers are completed.

In Figs. 2 and 3 the electrical system for one of the reversible pitch propellers is shown. The same system may be applied individually to any one of the propellers on an aircraft for which reverse pitch control is desired. Some of the components in Fig. 2 are the conventional pitch increasing, pitch decreasing, and feathering controls which would be applied to propellers not equipped with the reversing control system. The diagram is divided into several zones, zone A indicating the power equipment, zone B the control and switching equipment, zone C the limit switch equipment in the propeller, and zone D the propeller pitch changing motor. As to the power equipment in zone A, a battery 30 or any other primary current supply source, provides power at moderate voltage for the purpose of operating the propeller during normal pitch changing. In order to expedite the feathering and pitch reversing operation phases, a power booster is provided which comprises a motor generator set 31 whose operation is controlled by a relay 32. The normal power bus is shown at 33, the high power bus at 34, and the ground return at 35. The battery 30 supplies power directly to the bus 33 through a main control switch 36. The positive pole of the battery is connected to one brush of the generator and to one brush of the motor through a wire 37. The other brush of the generator connects with the solenoid of the relay 32, the other wire of the solenoid comprising the high power bus 34. The switch of the relay is connected across the low voltage line. If there is a power demand on the high voltage bus 34, the relay solenoid 32 is energized initially by low voltage through the generator winding, the solenoid thereby closing the relay switch to energize the motor which shortly comes up to speed and operates the generator whose output passes through the solenoid of the relay 32 to the bus 34. Immediately the power demand ceases on the bus 34, the relay 32 opens and the motor generator is cut out. Thus, it will be seen that either high or low voltage is immediately available in the buses 34 or 33 upon demand.

Referring briefly to zone D, the propeller pitch changing motor 40 is provided with two series fields 41 and 42 selectively operable to energize the motor for pitch increase or pitch decrease. In zone C, 43 represents a cam turned by the motor 40 at a greatly reduced speed through an appropriate reduction gear, such reduction gear being mechanically connected to the propeller blades for effecting pitch changes thereof. The cam 43 cooperates with four circumferentially disposed switches 44, 45, 46, and 47, these switches establishing pitch limits in accordance with the pitch change selection as made by the operator. Switch 44 is the feathering limit switch which will cause cessation of blade pitch change when the propeller blades are alined in a fore-and-aft direction. Feathering is used in flight when an engine ceases functioning or when it is desired to stop any one engine of the aircraft and to reduce the propeller drag. Switch 45 is the high pitch limit switch for normal flight operation. Switch 46 is the low pitch limit switch for normal flight operation. Switch 47 is the reverse pitch limit switch which stops blade pitch change in a reverse pitch direction at some appropriate negative angle of propeller blade pitch.

For the purpose of easily distinguishing the various pitch limits, the switches 44 to 47 are respectively marked F, H, L, and R, meaning feathering, high, low, and reverse. The power lines to these switches pass through a slip ring assembly indicated by the terminals on the line 49 to power wires respectively designated F, H, L, and R which lead to the control system which will now be described.

For normal pitch changes between the high and low pitch limits, low voltage power passes from the bus 33 through the switch of the relay 50 (whose function will be described later) to a three-point selector switch 51. One point of the switch leads directly to the H wire, a second directly to the L wire, and the third to an engine-operated safety switch 52 and thence to the central terminal 53 of an engine operated governor unit 54 which is provided with high and low pitch contacts 55 and 56 respectively connected to the H and L wires. When the selector switch 51 is connected to the governor 54, automatic propeller pitch adjustment is maintained to control engine speed in a manner which is well known in the art. The other two points of the switch 51 afford a manual rather than automatic control to increase or decrease pitch within normal limits, as desired.

In order to effect feathering of the propeller, a relay comprising a solenoid 58 and a switch 59 is provided, the solenoid being connected to the low voltage bus 33 through closure of a feathering control switch 60, the other end of the solenoid being connected through the solenoid of the relay 50 to the ground 35. When the solenoid 58 is energized, the relay switch 59 is closed which connects the feathering wire to the high power bus 34 whereby propeller feathering will be initiated through the motor 40 until the cam 43 opens the limit switch 44 whereupon the feather-position is established. The relay 50, while the feathering switch 60 is closed, opens the circuit between the low voltage bus 33 and the switch 51 so that no manual or automatic pitch change may be effected until the feathering switch 60 has been opened to allow closure of the switch of the relay 50. Pitch decrease from feathering to the normal range is accomplished automatically by the governor if the engine is running, or by pitch decreasing selection through the switch 51.

When reverse pitch on the propeller is desired, the switch arm of a reversing switch 62 is moved to the reverse contact 63, energizing the relay solenoid 64 from the low voltage power supply which closes the relay switch 61 connecting the high voltage bus 34 with the reverse wire, effecting propeller pitch change until the reverse limit switch 47 opens when reverse pitch is reached. The return line from the solenoid 64 is also connected through the relay 50 for the same purpose as above outlined in connection with feathering.

When it is desired to return the propeller from reverse pitch to the normal range, the arm of the switch 62 is moved to the left to the contact 66 by which the low voltage bus 33 is connected through the normally closed switch 68 of a relay 69 to the solenoid 70 of a normally open relay 71. This relay is provided with a switch 72 which when closed connects the high voltage bus 34 directly to the H wire to initiate fast propeller pitch change toward the normal range. When the switch 62 is closed on the point 66, a holding solenoid 73 of the relay 69 is also energized, this solenoid also being connected to the relay 50. This holding solenoid when energized is adequate to open the switch 68 by itself. When the relay 71 was closed, a switch 74 thereof was also closed, which switch is connected through a closing solenoid 75 of the relay 69 and to the low pitch wire. During pitch position below the normal low pitch range, the low pitch limit switch 46 is open, but when the propeller pitch reaches the normal low pitch range, the low pitch limit switch closes to energize the closing solenoid 75 of the relay 69 which was previously prepared for operation by closure of the switch 74. Note that voltage to coil 75 comes from boosted voltage feeding back through the inoperative field 42. Thus, the switch 68 of the relay 69 is opened to de-energize the relay 71, opening the power switch 72 thereof and causing cessation of further propeller pitch change. The solenoid 73 of the relay 69 will continue to hold the switch 68 open until such time as the reverse control switch 62 is neutralized or opened from its contact 66. While the solenoid 73 is energized, the relay 50 is energized so that no normal operation of the propeller may be initiated by operation of the switch 51 until the switch 62 is neutralized. After opening switch 62, low speed return from reverse pitch could, of course, be effected by low voltage power through the closing of the selector 51 to pitch increasing position or through governor action, but high speed return is possible through the means just described.

Additional control devices for the propeller system include a reverse safety switch 80 which, though not essential, prevents the operator from reversing propeller pitch without a definitely conscious intention to do so on his part. That is, with the multifarious controls in a modern aircraft, inadvertent operation of the reverse control switch 62 might be effected. Unless the safety switch 80 is also closed, operation of the switch 62 will be of no avail. An indicating lamp 82 is also provided, this lamp serving to indicate whether or not the power booster 31 is in operation. The lamp is merely connected across the power trunks 33 and 34.

Fig. 4 shows an alternative electrical control system for feathering, pitch reversal and return from either feathering or reverse pitch. This system differs from that of Fig. 2 in that an extra slip ring 85 is added between the propeller and airplane, and an extra limit switch 86 is associated with the cam 43 in the propeller, this switch being open between the normal high and low pitch limits but being closed otherwise. With the addition of another limit switch and slip ring, the switching system becomes very simple and may be accomplished by simple double-throw double-pole switches, without relays. Three double pole double throw switches 87, 88 and 89 are shown, for operating the propeller to feathering pitch, to return from feathering or reverse, and to reverse the pitch respectively. The right hand sides of the three switches, as at 90, 91 and 92 are serially connected with the main low voltage power switch 36 and with the manual pitch selector switch 51 so that, when any one of the three switches 87, 88 or 89 is moved to its functional position, the low voltage power for the pitch change between normal high and low limits is open-circuited. The center lefthand points 93 and 94 of switches 87 and 88 are connected together, while the lower lefthand point 95 of the switch 88, and the central lefthand point 96 of the switch 89 are connected together. The lower lefthand point 97 of the switch 87 and the lower lefthand point 98 of the switch 89 are connected together and are also connected to the starting relay 32 of the voltage booster motor-generator set 31. The upper lefthand points 99, 100 and 101 of the switches 87, 88 and 89 are connected respectively to the feathering, return, and reverse slip ring brushes as shown.

When all of the switches 87, 88 and 89 are in the off position, the switch 51 is in circuit for normal high and low pitch adjustment either manually or by the governor 54. When so adjusted, the booster 31 is disconnected from all slip rings. If the feather switch 87 be moved to the feather position, booster voltage reaches said switch across the switch points 98, 96 and 95, 94 whereupon, since the contacts 93 and 99 are closed, power is directed to the feathering slip ring to effect propeller feathering so long as the feathering limit switch is closed. When the feather switch 87 is moved to the off position, return from feathering may be accomplished by the governor or by the switch 51 or alternatively, the return switch 88 may be moved to the up position whereupon high voltage from the booster 31 is fed to the return slip ring 85 through the contacts 93, 97 and 94, 100. As soon as return has been effected, the switch 88 is moved to the off position. If reverse pitch is desired, the switch 89 is moved to the up position whereupon high voltage from the booster 31 passes to the reverse slip ring through the points 97, 93 and 94, 95, and thence across the switch points 96, 101 of the reversing switch.

Preferably, the three switches 87, 88 and 89 will be arranged with mechanical interlocks so that only one of said switches at a time may be moved to its up or active position. However, even if no interlocks were used, the system is perfectly safe if more than one of the three switches were to be moved to their up or active positions at the same time for the transmission of high power to any one of the slip rings associated with the switches depends upon the other two switches being in the off position. Although double pole double throw knife switches are indicated diagrammatically for the sake of simplicity, actual switches used in the system would have no intermediate position of adjustment between off and their functional positions.

Otherwise than as above described, the system of Fig. 4 includes the same components as the previously described system. That is, the motor-generator set, battery, governor, main switch 36, and propeller motor are identical. There is one slight difference as to functional switching in that the main switch 36 is not in circuit with the booster 31, so that emergency power for feathering or pitch reversal, or return therefrom, can be utilized despite the switch 36 being open. This is perfectly proper, since should any one of the three switches 87, 88 or 89 be left in its functional position, propeller pitch change would cease so soon as the associated limit switch in the propeller is opened.

In a four-motored aircraft as in Fig 1, propellers 17 and 18 would be provided with reverse pitch controls as in Fig. 2, along with feathering control and manual or automatic normal pitch control. The outboard propellers 16 and 19 would ordinarily not be provided with the reverse pitch control system but would have feathering control and manual or automatic normal pitch control. All propellers would have high power as well as low power for expediating feathering pitch change. Obviously, the outboard rather than the inboard propellers, or all propellers, might be provided with pitch reversing controls.

In a landing operation, the following routine is one of several which could be used. The aircraft pilot would throw the reverse pitch switches on the inboard propellers after making water contact. Then, in maneuvering to a mooring, engine throttles are used in substantially the same way as reverse gear controls on a twin-screw power boat. Reverse pitch settings are used in maneuvering for take-off position.

The opposite setting of inboard and outboard propellers might be used to good effect in running up the engines for test preparatory to take-off—a maneuver not feasible ordinarily since the flying boat would immediately gain headway.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a controllable pitch propeller whose blades are capable of movement to a reversed pitch position, means comprising a motor for effecting blade pitch changes, limit stops for normal high and low pitch, a limit stop for reverse pitch, means selectively operable to set up the reverse pitch limit stop for operation and at the same time cancelling the effect of the low pitch limit stop, whereby the blade pitch may pass the normal low pitch limit and move to the reverse pitch position, and means to change the blade pitch at greater than normal speed during pitch reversing movement.

2. In an electrically operated controllable pitch propeller system including an electric pitch changing motor, a power source of normal voltage, means to connect the power source to the motor to change the pitch in one range, a voltage booster energized by said power source, and means coincidentally operable to select an abnormal pitch adjustment for the propeller and to connect the propeller motor to the voltage booster for operation whereby the pitch is changed at a speed substantially greater than the speed of pitch change in said one range.

3. In an electrically operated controllable pitch propeller system including a propeller pitch changing motor, a normal voltage power source, means to connect the motor to the power source to change the pitch in one range, a motor-generator the motor thereof being drivable by the power source and the generator thereof being connectable to said propeller motor, means to connect the generator to the propeller motor whereby the pitch is changed at a speed substantially greater than the speed of pitch change in said one range, and means responsive to such connection to connect the motor of the motor generator to said power source.

4. In an electrical motor operated propeller pitch changing system, normal pitch limiting switches operable to open the motor circuit when propeller pitch tends to increase or decrease beyond limits of substantially 60° and 10° respectively, a reverse pitch limit switch to open the motor circuit when the propeller pitch tends to increase negatively more than substantially 20°, low and high voltage power sources for said motor, means to connect the low voltage source to the motor for normal propeller operation between said normal pitch limits, the tendency toward movement of the blades beyond said limits being suppressed by opening of the switches to disconnect the low voltage source from the motor, and means to connect the high voltage power source to the motor for subsequent disconnection by the reverse pitch limit switch when the reversal of blade pitch opens the latter.

5. In an electrical motor operated propeller pitch changing system, normal pitch limiting switches operable to open the motor circuit when propeller pitch tends to increase or decrease beyond limits of substantially 60° and 10° respectively, a reverse pitch limit switch to open the motor circuit when the propeller pitch tends to increase negatively more than substantially 20°, low and high voltage power sources for said motor, means to connect the low voltage source to the motor for normal propeller operation between said normal pitch limits, the tendency toward movement of the blades beyond said limits being suppressed by opening of the switches to disconnect the low voltage source from the motor, means to connect the high voltage power source to the motor for subsequent disconnection by the reverse pitch limit switch when the reversal of blade pitch opens the latter, and means to connect the high voltage power source to the motor for return of the propeller blades from reverse pitch to the normal pitch range, said means including devices to set up the normal low pitch limit switch for disconnection of the high voltage power source as the propeller blade pitch passes the normal low pitch limit.

6. In a controllable pitch propeller whose blades are capable of movement to a reversed pitch position, means comprising a motor for effecting blade pitch changes, limit stops for normal high and low pitch, a limit stop for reverse pitch, means selectively operable to set up the reverse pitch limit stop for operation and at the same time cancelling the effect of the low pitch limit stop, whereby the blade pitch may pass the normal low pitch limit and move to the reverse pitch position, means to change the blade pitch at greater than normal speed during pitch reversing movement, and means to set up the normal low pitch limit stop to effect cessation of blade pitch change when blade pitch change is initiated to return from the reverse pitch setting to the normal operating range.

7. A controllable pitch propeller system comprising propeller blades, means for changing the pitch of said blades, means for establishing low, high and feather pitch limits for said blades, means for operating said first named means to change the pitch of said blades in the normal range defined by said low and high pitch limits, means for cancelling the effect of said high pitch limit and for establishing said feather pitch limit, and means for operating said first named means at a speed substantially greater than the speed of pitch change in said normal range to change the pitch of said blades until they reach said feather pitch limit.

8. A controllable pitch propeller system comprising propeller blades, means for changing the pitch of said blades, means for establishing low, high and feather pitch limits for said blades, means for operating said first named means to change the pitch of said blades in the normal range defined by said low and high pitch limits, means for cancelling the effect of said high pitch limit and for establishing said feather pitch limit, and means for operating said first named means at a speed substantially greater than the speed of pitch change in said normal range to change the pitch of said blades until they reach said feather pitch limit, the greater speed of pitch change last noted being effective throughout a part at least of said normal range.

9. A controllable pitch propeller system comprising propeller blades, means for changing the pitch of said blades, means for establishing high, low and reverse pitch limits for said blades, means for operating said first named means to change the pitch of said blades in the normal range defined by said high and low pitch limits, means for cancelling the effect of said low pitch limit and for establishing said reverse pitch limit, and means for operating said first named means at a speed substantially greater than the speed of pitch change in said normal range to change the pitch of said blades between said normal range and said reverse pitch limit.

10. A controllable pitch propeller system comprising propeller blades, means for changing the pitch of said blades, means for establishing high, low and reverse pitch limits for said blades, means for operating said first named means to change the pitch of said blades in the normal range defined by said high and low pitch limits, means for cancelling the effect of said low pitch limit and for establishing said reverse pitch limit, and means for operating said first named means at a speed substantially greater than the speed of pitch change in said normal range to change the pitch of said blades between said normal range and said reverse pitch limit, the greater speed of pitch change last noted being effective throughout a part at least of said normal range.

11. A variable pitch propeller comprising rotatably mounted blades, electromotive means, a supply of substantially constant-voltage electric power for actuating said electromotive means to alter the pitch of said blades in one range of pitch adjustment, and means for altering the pitch of said blades in another range of pitch adjustment at a speed substantially greater than the speed of pitch change in said one range, said last named means comprising an arrangement for boosting the voltage of said power supply.

12. A variable pitch propeller comprising rotatably mounted blades, electromotive means for altering the pitch thereof, a supply of substantially constant-voltage electric power for actuating said motive means, a control system for normally restricting pitch variations within high and low limits adapted to ordinary service requirements, and means for optionally rendering inoperative one or the other of said limits and for simultaneously boosting the voltage of said power supply to thereby effect pitch adjustment at a speed substantially higher than the speed at which pitch adjustment is effected between said high and low limits.

CHARLES W. CHILLSON.